(12) United States Patent
Okuhara

(10) Patent No.: US 11,275,546 B2
(45) Date of Patent: Mar. 15, 2022

(54) IMAGE CAPTURE APPARATUS AND CONTROL METHOD THEREOF

(71) Applicant: CANON KABUSHIKI KAISHA, Tokyo (JP)

(72) Inventor: Ryusuke Okuhara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 16/882,732

(22) Filed: May 25, 2020

(65) Prior Publication Data

US 2020/0379701 A1    Dec. 3, 2020

(30) Foreign Application Priority Data

May 30, 2019    (JP) .............................. JP2019-101487

(51) Int. Cl.
*G06F 3/12* (2006.01)
*H04N 5/232* (2006.01)

(52) U.S. Cl.
CPC .......... *G06F 3/1292* (2013.01); *G06F 3/1256* (2013.01); *H04N 5/23229* (2013.01)

(58) Field of Classification Search
None
See application file for complete search history.

(56) References Cited

U.S. PATENT DOCUMENTS

| 8,756,305 B2* | 6/2014 | Hirose | H04L 67/16 |
| | | | 709/224 |
| 10,149,233 B2* | 12/2018 | Kimura | H04W 48/10 |
| 10,168,966 B2* | 1/2019 | Yasukawa | G06F 3/1236 |
| 10,289,941 B2* | 5/2019 | Okuhara | G06K 15/1819 |

FOREIGN PATENT DOCUMENTS

JP    2005-064552 A    3/2005

* cited by examiner

*Primary Examiner* — Paul F Payer
(74) *Attorney, Agent, or Firm* — Cowan, Liebowitz & Latman, P.C.

(57) ABSTRACT

An image capture apparatus comprises a communication interface configured to join a wireless network generated by a print apparatus and a control unit configured to perform control so as to execute information acquisition processing in response to recognized information for joining the wireless network. The control unit performs control so as to join the wireless network generated by the print apparatus based on information read by an image capturing unit, acquire information regarding the print apparatus, and leave the wireless network generated by the print apparatus, and when an instruction to print an image is accepted in a state where the information regarding the print apparatus has been acquired, the image capture apparatus joins the wireless network generated by the print apparatus, and instructs the print apparatus to print an image, via the wireless network.

15 Claims, 8 Drawing Sheets

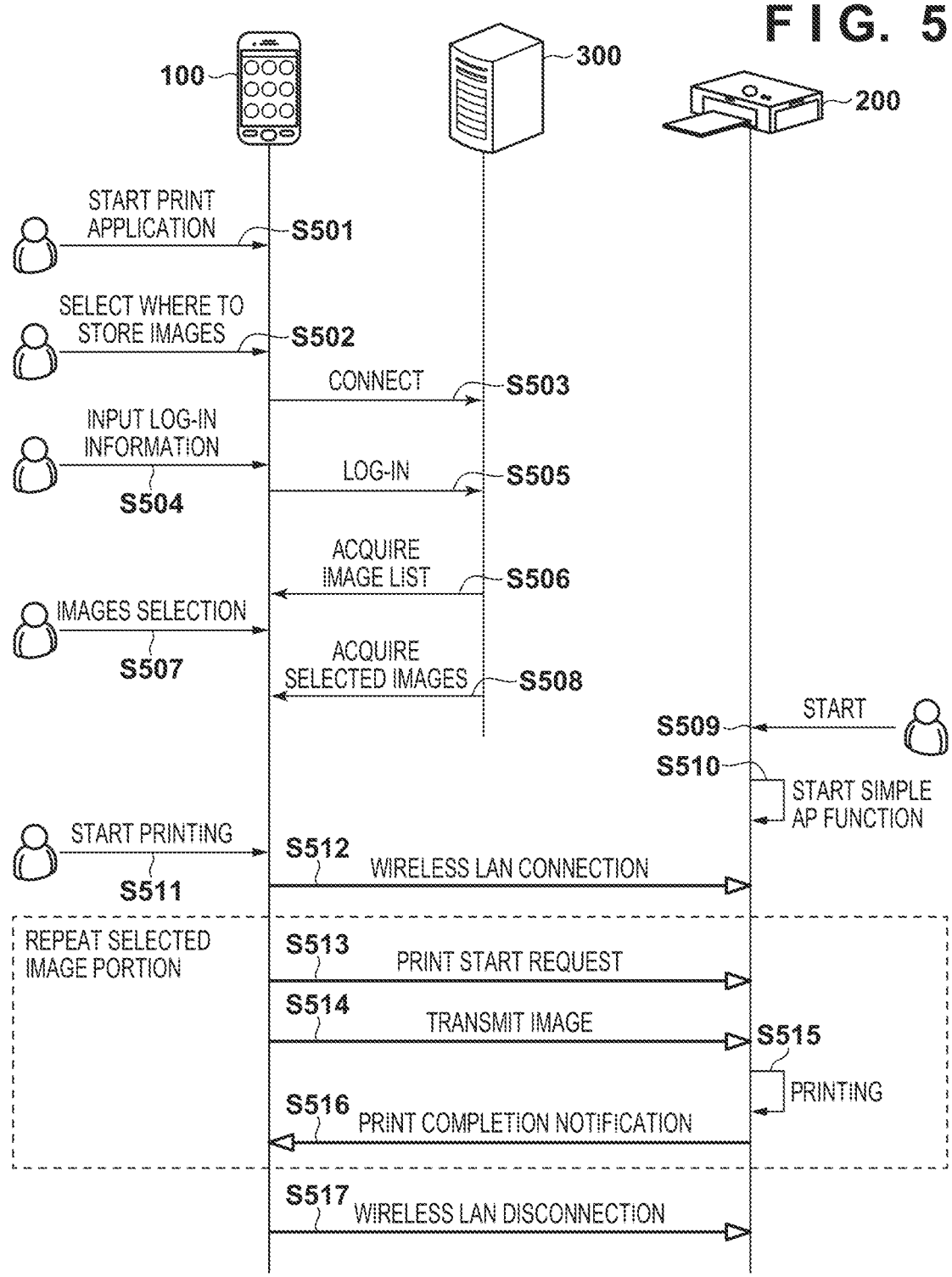

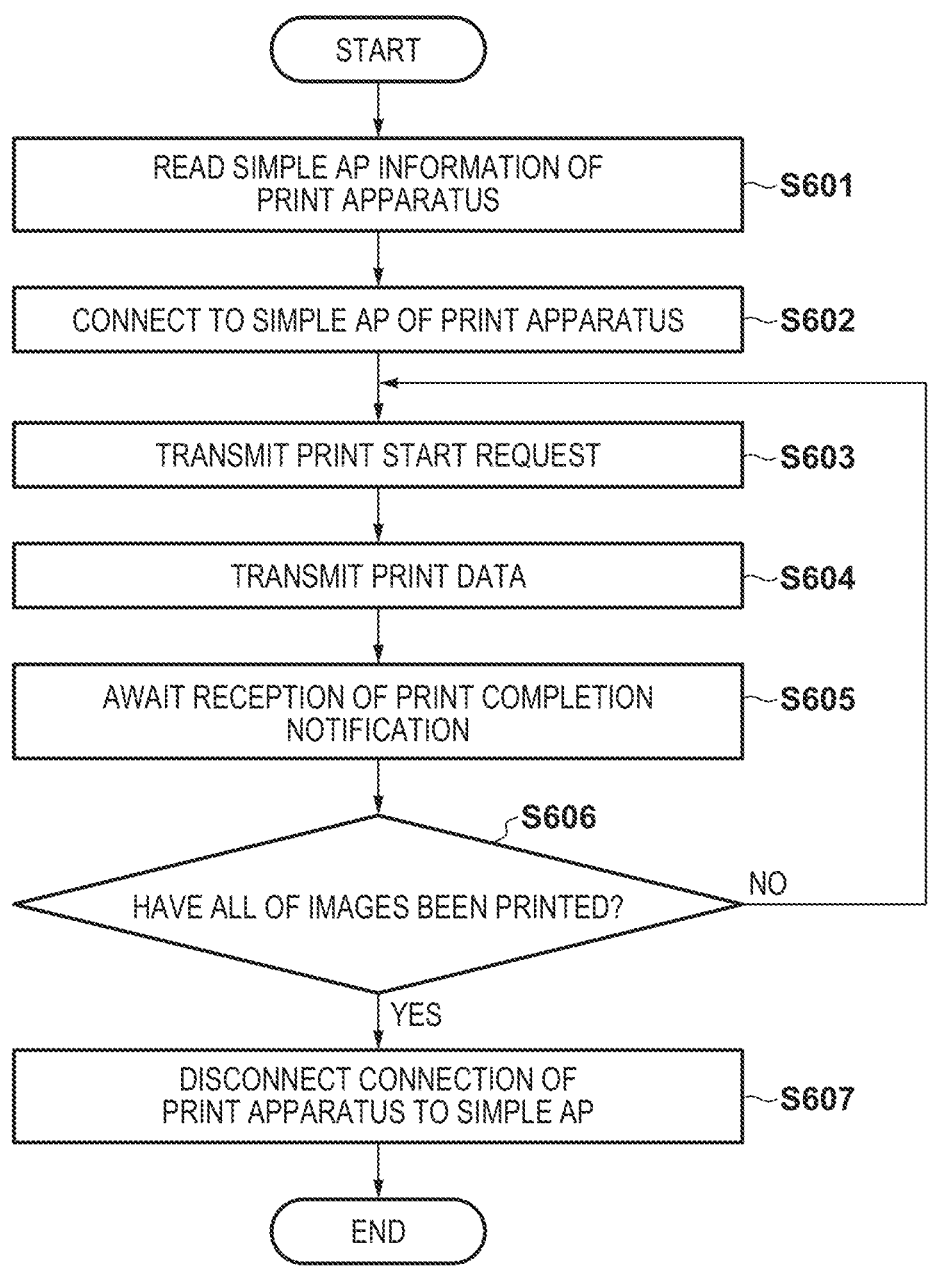

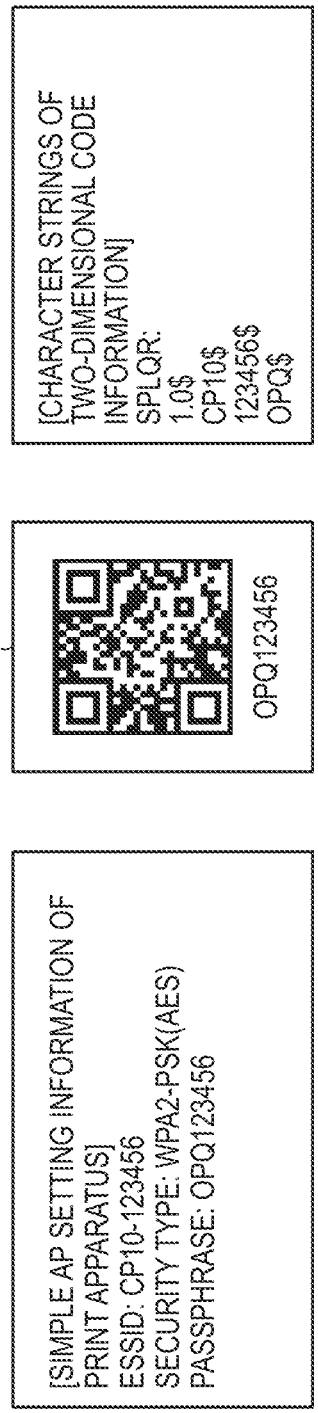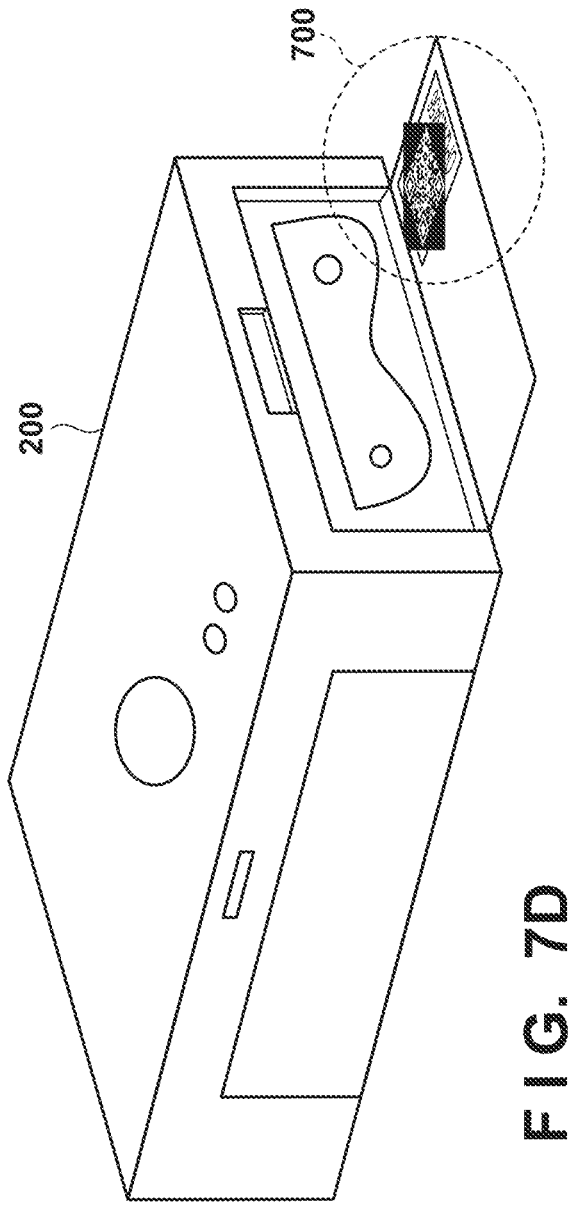

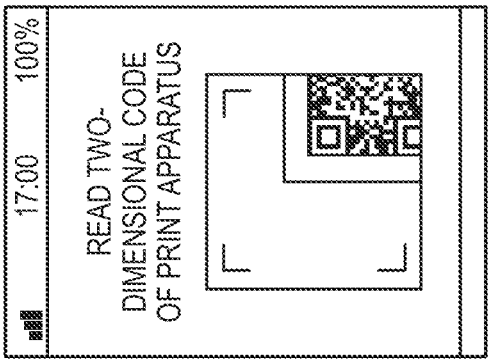
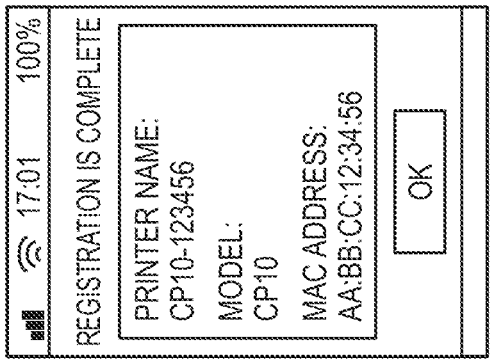
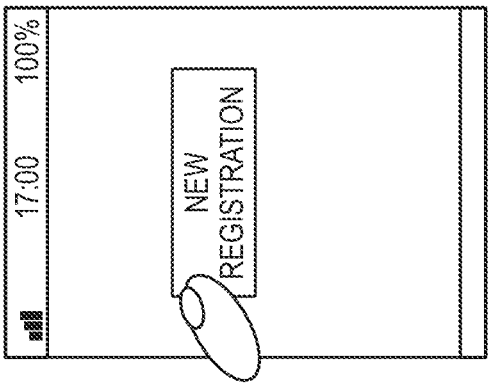
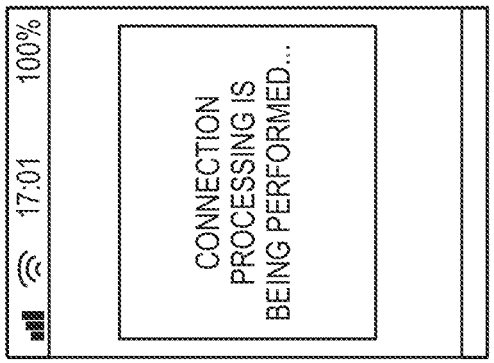
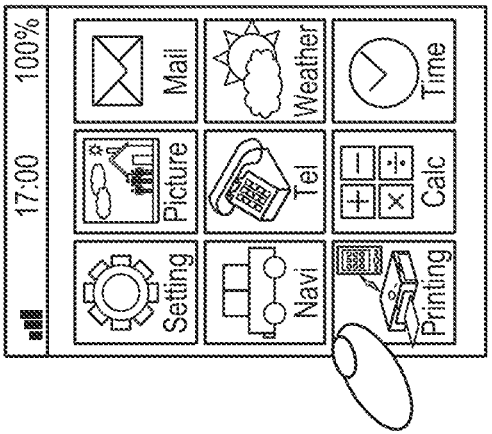
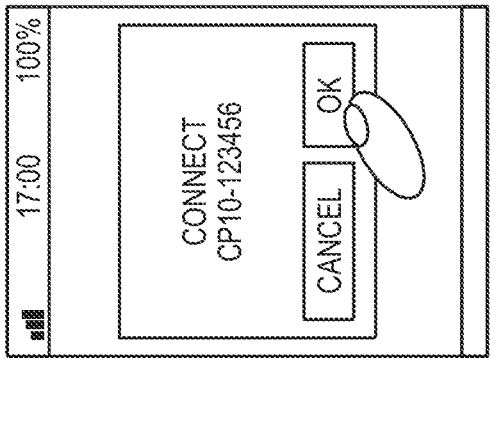

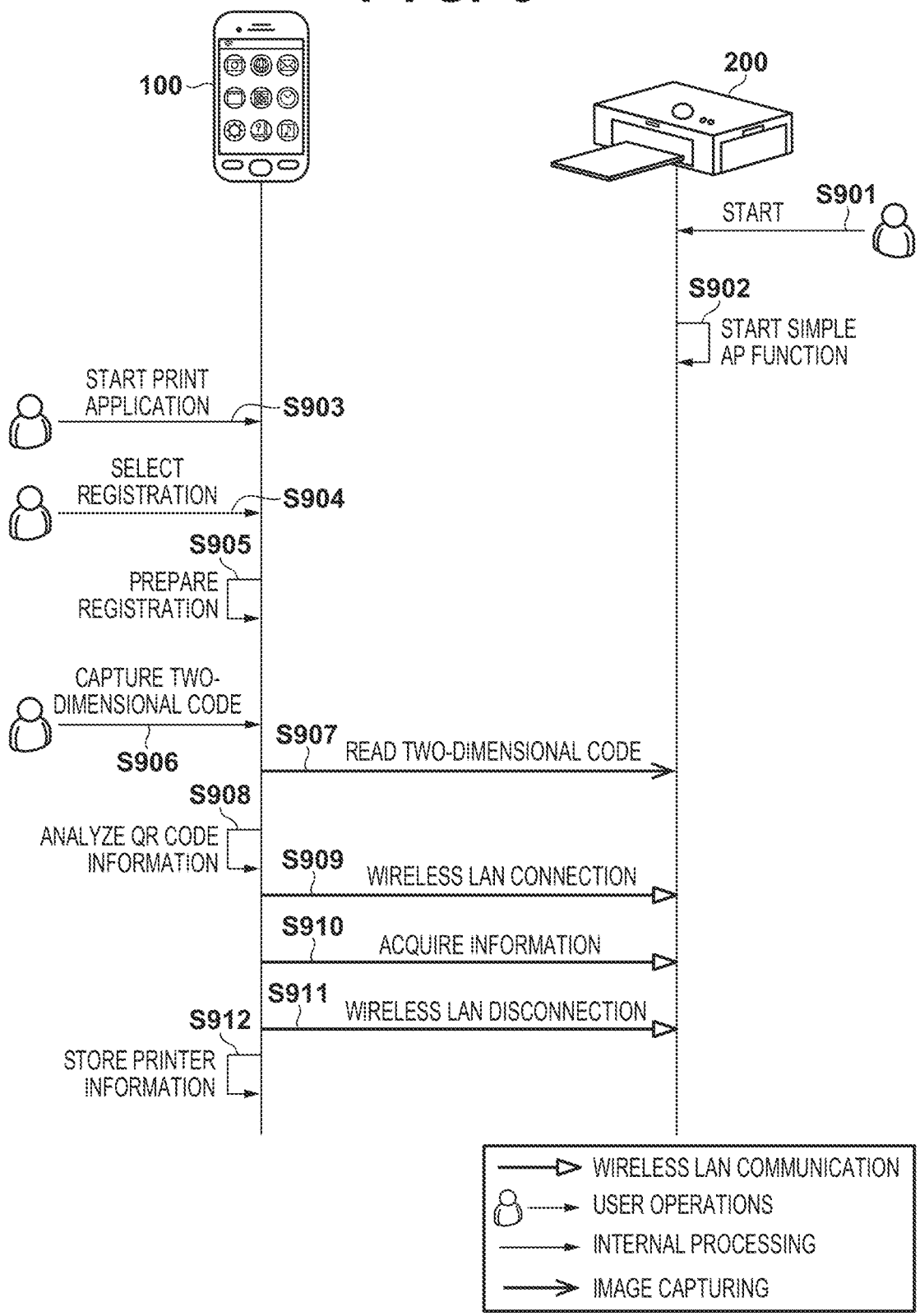

IMAGE CAPTURE APPARATUS AND CONTROL METHOD THEREOF

BACKGROUND OF THE INVENTION

Field of the Invention

The present invention relates to an image capture apparatus, a control method, and the like for wirelessly communicating with a print apparatus.

Description of the Related Art

A print apparatus such as a printer can receive image data from an image capture apparatus such as a smart phone that is a type of mobile phone, using an external network that includes a wireless LAN access point, a router, and the like and print the received image data. In addition, there are also print apparatuses that can print images received from an image capture apparatus without using an external network, as with Japanese Patent Laid-Open No. 2005-64552.

The following methods are examples of forms in which no external network is used.

- A method for using an ad hoc mode that is an operation mode of wireless LAN
- A method for using Wi-Fi Direct (registered trademark) stipulated by Wi-Fi Alliance
- A method in which one of a print apparatus and an image capture apparatus has a simple wireless LAN access point function, and the other is connected to the access point In addition, there is an aspect in which a print apparatus has a simple wireless LAN access point function, and an image capture apparatus joins a wireless network formed by the print apparatus, and the like.

However, when an image capture apparatus is connected to a wireless network formed by a print apparatus, the image capture apparatus cannot connect to the Internet using wireless LAN communication or a public wireless network. Therefore, the image capture apparatus cannot download, via the Internet, images saved in a server or the like that provides an online storage service and a social network service.

SUMMARY OF THE INVENTION

The present invention has been made in consideration of the aforementioned problems, and realizes techniques for minimizing a period in which an image capture apparatus is connected to a wireless network formed by a print apparatus.

In order to solve the aforementioned problems, the present invention provides an image capture apparatus comprising: a communication interface configured to join a wireless network generated by a print apparatus; and a memory and at least one processor and/or at least one circuit which function as: an instruction unit configured to instruct the print apparatus to print an image; a recognition unit configured to recognize information for joining the wireless network, from an image captured by an image capturing unit; and a control unit configured to perform control so as to execute information acquisition processing in response to the recognition unit having recognized the information for joining the wireless network, wherein, in the information acquisition processing, the control unit performs control so as to join the wireless network generated by the print apparatus, via the communication interface based on information read by the image capturing unit, acquire information regarding the print apparatus via the communication interface, and leave the wireless network generated by the print apparatus, and when an instruction to print an image is accepted from a user in a state where the information regarding the print apparatus has been acquired, the image capture apparatus joins the wireless network generated by the print apparatus via the communication interface, and the instruction unit instructs the print apparatus to print an image, via the wireless network.

In order to solve the aforementioned problems, the present invention provides a method of controlling an image capture apparatus that has a communication interface configured to join a wireless network generated by a print apparatus, the method comprising: recognizing information for joining the wireless network, from an image captured by an image capturing unit; and performing control so as to execute information acquisition processing in response to information for joining the wireless network having been recognized, wherein, in the information acquisition processing, control is performed so as to join the wireless network generated by the print apparatus, via the communication interface based on information read by the image capturing unit, acquire information regarding the print apparatus via the communication interface, and leave the wireless network generated by the print apparatus, and when an instruction to print an image is accepted from a user in a state where the information regarding the print apparatus has been acquired, the image capture apparatus joins the wireless network generated by the print apparatus via the communication interface, and an instruction to print an image is given to the print apparatus via the wireless network.

In order to solve the aforementioned problems, the present invention provides a non-transitory computer-readable storage medium storing a program for causing a computer to execute a method of controlling an image capture apparatus that has a communication interface configured to join a wireless network generated by a print apparatus, the method comprising: recognizing information for joining the wireless network, from an image captured by an image capturing unit; and performing control so as to execute information acquisition processing in response to information for joining the wireless network having been recognized, wherein, in the information acquisition processing, control is performed so as to join the wireless network generated by the print apparatus, via the communication interface based on information read by the image capturing unit, acquire information regarding the print apparatus via the communication interface, and leave the wireless network generated by the print apparatus, and when an instruction to print an image is accepted from a user in a state where the information regarding the print apparatus has been acquired, the image capture apparatus joins the wireless network generated by the print apparatus via the communication interface, and an instruction to print an image is given to the print apparatus via the wireless network.

According to the present invention, it is possible to minimize a period in which an image capture apparatus is connected to a wireless network formed by a print apparatus.

Further features of the present invention will become apparent from the following description of exemplary embodiments (with reference to the attached drawings).

BRIEF DESCRIPTION OF THE DRAWINGS

FIG. 5 is a sequence diagram illustrating operations of the print apparatus when performing printing according to the present embodiment.

FIG. 6 is a flowchart illustrating operations of the mobile phone when performing printing according to the present embodiment.

FIGS. 7A to 7D are two-dimensional codes of the print apparatus according to the present embodiment.

FIGS. 8A to 8F are diagrams illustrating User Interface screens of an application of the mobile phone when registering information of the print apparatus according to the present embodiment.

FIG. 9 is a sequence diagram illustrating operations of the print apparatus when registering information of the print apparatus according to the present embodiment.

DESCRIPTION OF THE EMBODIMENTS

Figure 1:
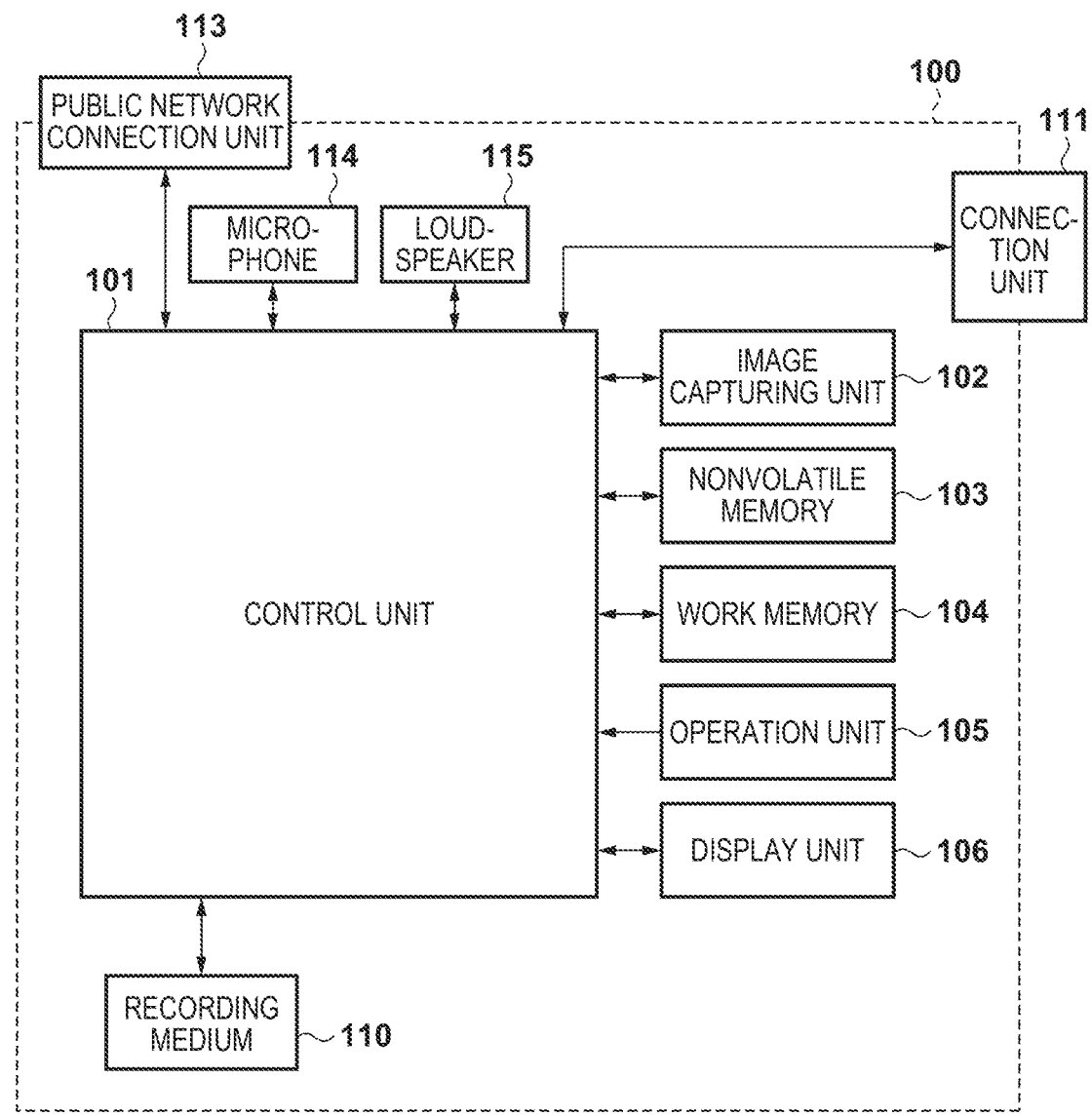
FIG. 1 is a block diagram showing a configuration of a mobile phone according to a present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Configuration of Mobile Phone 100

First, the configuration and functions of the mobile phone 100 that is an example of an image capture apparatus of the present embodiment will be described with reference to FIG. 1. In the present embodiment, an example in which the image capture apparatus is applied to a smartphone (hereinafter, referred to as a mobile phone), which is a type of a mobile phone, will be described. However, the present invention is not limited to this example. For example, the present embodiment may be applied to a digital camera with a wireless LAN function, a playback apparatus such as a portable media player, or a personal computer (PC), a tablet device, or an information processing apparatus such as a glasses-type terminal or a wristwatch-type terminal.

A control unit 101 is an arithmetic processing unit (CPU), which comprehensively controls the overall mobile phone 100, and implements communication processing and control processing (to be described later) by executing programs stored in a nonvolatile memory 103 (to be described later). Note that a plurality of pieces of hardware may control the overall apparatus by sharing processes instead of the control unit 101 controlling the overall apparatus.

An image capturing unit 102 includes a lens group including a zoom lens and a focus lens and a shutter having a stop function. The image capturing unit 102 also includes an image sensor formed from a CCD, CMOS element, or the like which converts an object image into electrical signal, and an A/D converter which converts the analog image signal output from the image sensor into digital signal. Under the control of the control unit 101, the image capturing unit 102 converts optical image of an object formed by the lens included in the image capturing unit 102 into electric signal by the image sensor, performs noise reduction processing or the like on the converted signal, and outputs image data composed of digital signal. After the image data output from the image capturing unit 102 is stored in a buffer memory and the control unit 101 performs a predetermined calculation to the image data, and then is recorded on the recording medium 110. In addition to the captured image data being recorded on the recording medium 110, the capture image data may be saved and managed in a server that provides an online storage service including a social networking service (SNS) on the Internet via a connection unit 111 and a public network connection unit 113 described below (hereinafter, referred to as a service server). The case of saving the captured image data in the service server may be a case of uploading the image designated by the user, or automatically uploading some or all of the images by the OS (Operating System) of the mobile phone 100 or the installed application. Further, the image capturing unit 102 can read a two-dimensional code of the print apparatus 200 described later, and the control unit 101 can analyze information obtained by capturing the two-dimensional code by the image capturing unit 102 and recognize character strings or the like of the two-dimensional code information before being encoded.

The nonvolatile memory 103 is an electrically erasable/recordable memory, and, for example, an EEPROM is used. Constants, programs, and the like for the operation of the control unit 101 are recorded in the nonvolatile memory 103. Here, the programs include those for executing communication processing with the print apparatus 200 which will be described later in the present embodiment.

The nonvolatile memory 103 stores an OS (operating system), which is the basic software that is to be executed by the control unit 101, and applications which implement extended functions in cooperation with this OS. Also, in the present embodiment, the nonvolatile memory 103 stores an application (hereinafter, also referred to as a print application) for which the mobile phone 100 executes processing of downloading image data from a service server on the Internet, transmitting the image data to the print apparatus 200, and performing printing by the print apparatus 200.

Processing of the mobile phone 100 of the present embodiment is implemented by loading software that is provided by the application. Note that the application includes software that is executed when basic functions of the OS installed in the mobile phone 100 are to be used. Alternatively, the OS in the mobile phone 100 may include software that is executed to implement processing according to the present embodiment.

A work memory 104 is used as a work area where constants and variables for the operation of the control unit 101, programs read out from the nonvolatile memory 103, and the like are to be loaded. The work memory 104 is also used as a buffer memory for temporarily storing the image data captured by the image capturing unit 102 or an image display memory for a display unit 106.

An operation unit 105 is constituted by operation members such as various types of switches and buttons, and a touch panel, which accept various types of operations from the user. The operation unit 105 includes, for example, a button for turning ON or OFF of a power, a button for performing image shooting. The operation unit 105 also includes a touch panel that is formed integrally with the display unit 106 that will be described later. The operation unit 105 also includes an operation member such as a dedicated connection button for starting a communication with an external apparatus via a connection unit 111 (to be described later).

The display unit 106 displays, for example, a live view image at the time of shooting, a captured image, and characters for a dialogical operation. The display unit 106 is, for example, a display device such as a liquid crystal display or an organic EL display. The display unit 106 may be formed integrally with the mobile phone 100, or an external apparatus connected to the mobile phone 100. The mobile phone 100 needs only be connectable to the display unit 106 and have the function of controlling display performed by the display unit 106.

Image data output from the image capturing unit 102 is recorded on the recording medium 110, and an image file that has been recorded thereon by the control unit 101 is read out from the recording medium 110. The recording medium 110 may be a memory card or a hard disk drive that is externally attached to the mobile phone 100, or a flash memory or a hard disk drive that is built into the mobile phone 100. The mobile phone 100 may have at least a function for accessing the recording medium 110.

A connection unit 111 includes an interface for wirelessly and communicably connecting to an external apparatus such as the print apparatus 200 (to be described later). The mobile phone 100 according to the present embodiment can exchange data with an external apparatus via the connection unit 111. For example, image data generated in the image capturing unit 102 can be transmitted to the print apparatus 200 via the connection unit 111. Note that, in the present embodiment, the connection unit 111 includes an interface for communication with an external apparatus via a wireless LAN complying with the IEEE 802.11 standards. The control unit 101 implements wireless communication with the print apparatus 200 by controlling the connection unit 111. The connection unit 111 may be directly connected to the print apparatus 200 or may be configured to be connected via an access point. The connection unit 111 of the mobile phone 100 in the present embodiment has also a client mode that at least operates as a client in an infrastructure mode. By operating the connection unit 111 in the client mode, the mobile phone 100 of the present embodiment can operate as a client device in the infrastructure mode. When the mobile phone 100 operates as the client device, the mobile phone 100 can join in the network formed by the AP (Access Point) device by connecting to the neighboring AP device.

A public network connection unit 113 is an interface used for public wireless communication via a public wireless network. The mobile phone 100 can make a telephone call and perform data communication with another device via the public network connection unit 113. When making a telephone call, the control unit 101 inputs and outputs voice signals via a microphone 114 and a loudspeaker 115. In this embodiment, the public network connection unit 113 includes a communication method such as 3G or 4G such as a LTE, WiMAX, ADSL or FTTH. In the present embodiment, the public network connection unit 113 is an antenna, and the control unit 101 can connect to a public wireless network via the antenna. Note that the connection unit 111 and the public network connection unit 113 are not necessarily formed using independent pieces of hardware. For example, both the connection unit 111 and the public network connection unit 113 may be formed using a single antenna.

The control unit 101 of the mobile phone 100 according to the present embodiment controls the public network connection unit 113 and can connect to a service server on the Internet.

Configuration of Print Apparatus 200

Figure 2:
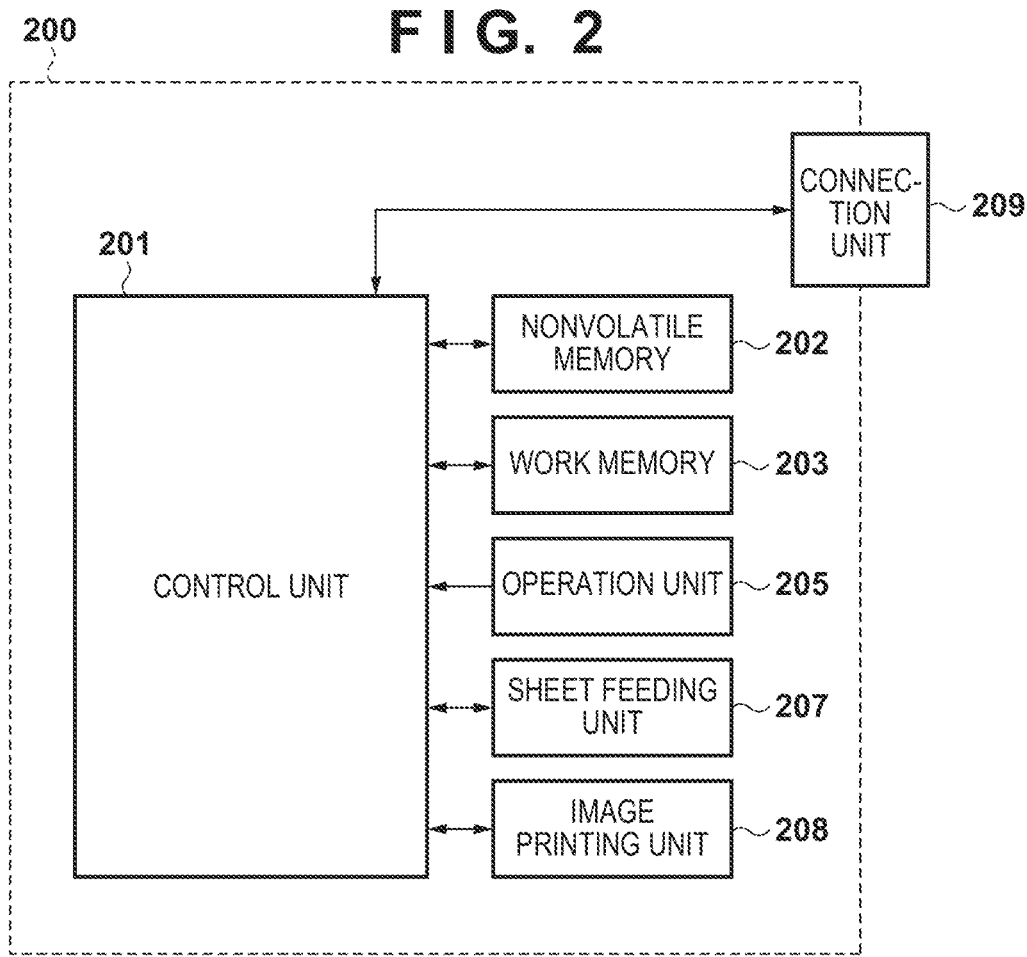
FIG. 2 is a block diagram showing a configuration of a print apparatus according to a present embodiment.

Next, the configuration and functions of the print apparatus 200 of the present embodiment will be described with reference to FIG. 2.

A control unit 201 is an arithmetic processing unit (CPU), which comprehensively controls the overall print apparatus 200, and implements communication processing and control processing (to be described later) by executing programs stored in a nonvolatile memory 202 (to be described later). Note that a plurality of pieces of hardware may control the overall apparatus by sharing processes instead of the control unit 201 controlling the overall apparatus.

The nonvolatile memory 202 is an electrically erasable/recordable memory, and, for example, an EEPROM is used. Constants, programs, and the like for the operation of the control unit 201 are recorded in the nonvolatile memory 202. Here, the programs include those for executing communication processing with the mobile phone 100 which will be described later in the present embodiment.

A work memory 203 is used as a work area where constants and variables for the operation of the control unit 201, programs read out from the nonvolatile memory 202, and the like are to be loaded. The work memory 203 is also used as a buffer memory for temporarily storing image data received from an external apparatus such as the mobile phone 100 via a connection unit 209 (to be described later).

An operation unit 205 is constituted by operation members such as various types of switches and buttons, and a touch panel, which accept various types of operations from the user. The operation unit 205 includes, for example, a button for turning ON or OFF of a power, a button for performing various settings relating to a printing. When the print apparatus 200 has a display unit, the operation unit 205 also includes a touch panel that is formed integrally with the display unit. The operation unit 205 also includes an operation member such as a dedicated connection button for starting a communication with an external apparatus via a connection unit 209 (to be described later).

The sheet feeding unit 207 includes a storage unit that stores a plurality of recording sheets, and a conveyance unit that picks up recording sheets from the storage unit and conveys the recording sheet to an image printing unit 208 (to be described later). The sheet feeding unit 207 may have a configuration in which a sensor or a switch for obtaining the size of the stored recording sheet is provided, so that the size of the stored recording sheet can be obtained or the recording sheet of a plurality of sizes can be stored. Note that the recording sheet is not limited to paper, but includes sheet materials other than paper.

The image printing unit 208 prints an image or the like on the recording sheet conveyed from the sheet feeding unit 207.

A connection unit 209 is an interface for connecting to an external apparatus such as the mobile phone 100 (to be described above). The print apparatus 200 according to the present embodiment can exchange data with an external apparatus via the connection unit 209. For example, information for connecting to the print apparatus 200 can be transmitted to an external apparatus via the connection unit 209, or image data can be received from an external apparatus. Note that, in the present embodiment, the connection unit 209 includes an interface for communication with an external apparatus via a wireless LAN complying with the IEEE 802.11 standards. The control unit 201 implements wireless communication with an external apparatus by controlling the connection unit 209.

The control unit 201 controls the connection unit 209 and can communicably connect to a service server on the Internet via an external AP device (hereinafter, an external AP) different from the AP formed by the print apparatus 200.

The print apparatus 200 of the present embodiment can operate as a simple AP (hereinafter referred to as "simple AP") which is a kind of AP, but has a limited function. When the print apparatus 200 operates as the simple AP, the print apparatus 200 forms a network by itself. A device in the vicinity of the print apparatus 200 can recognize the print apparatus 200 as the AP device and join in a network formed by the print apparatus 200. It is assumed that program for operating the print apparatus 200 as described above is store in the nonvolatile memory 202.

Note that the print apparatus 200 according to the present embodiment is a kind of AP, but is a simple AP having no gateway function for transferring data received from a client to an Internet provider or the like. Therefore, even if data is received from another device joining in the network formed by the print apparatus 200 itself, it cannot be transferred to a network such as the Internet. Note that the print apparatus 200 may have a gateway function.

Network Configuration

Next, the configuration in which the mobile phone 100 and the print apparatus 200 of the present embodiment are wirelessly and communicably connected will be described with reference to FIG. 3.

Figure 3:
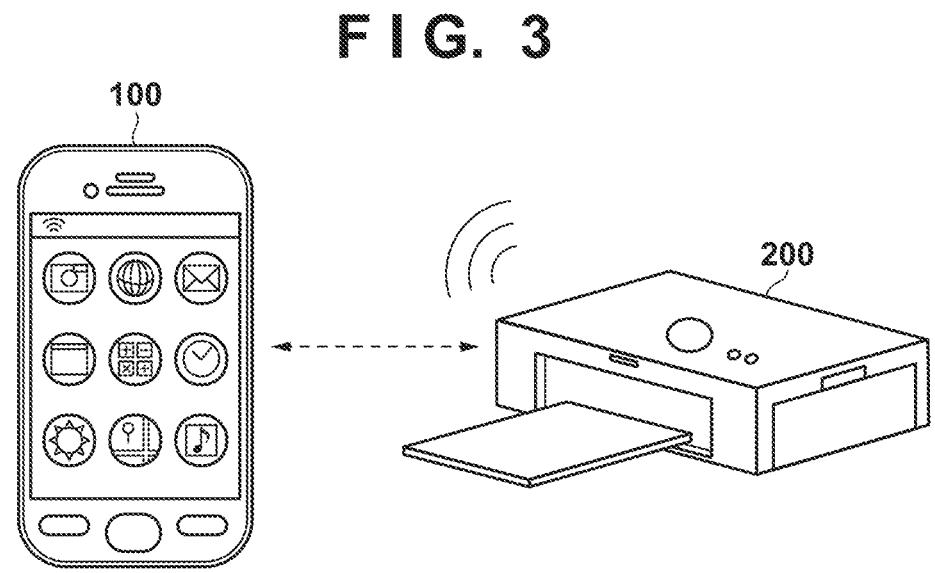
FIG. 3 is a diagram showing a system configuration in which the mobile phone and the print apparatus are connected according to the present embodiment.

FIG. 3 illustrates a communication form in which the mobile phone 100 and the print apparatus 200 are directly connected without any external AP therebetween. In the present embodiment, the print apparatus 200 operates as a simple AP, and forms a wireless LAN network. When operating as a simple AP, the print apparatus 200 starts periodical transmission of a beacon signal. As a result of the user performing an operation on the screen of the OS or an installed application, the mobile phone 100 detects the beacon signal, and joins the wireless LAN network formed by the print apparatus 200. Connection is then established after the devices have detected each other, device capability has been acquired, and the like, and a state is entered where data can be transmitted/received.

Note that the simple AP of the print apparatus 200 in the present embodiment does not have a gateway function that enables connection to an external network such as the Internet. Therefore, the mobile phone 100 that has joined the simple AP of the print apparatus 200 cannot transmit data to the Internet and the like via the simple AP.

According to the present embodiment, the mobile phone 100 can transmit/receive data to/from the print apparatus 200 by joining the wireless LAN network formed by the print apparatus 200. When operating as a simple AP, the print apparatus 200 can determine a network identifier, security information, and available channels of the wireless LAN network formed by the print apparatus 200 itself. Note that the security information refers to information that includes an authentication method, an encryption method, an encryption key, and the like.

The mobile phone 100, which is a communication partner device of the print apparatus 200, can join the wireless LAN network formed by the print apparatus 200, using the network identifier and security information. In the present embodiment, the network identifier is defined as an ESSID (Extended Service Set Identifier), but there is no limitation thereto.

Operation Procedure

Next, an operation procedure in which the mobile phone 100 of the present embodiment downloads image data from a service server on the Internet, transmits the image data to the print apparatus 200, and performs printing will be described with reference to FIGS. 4A to 4G, 5, and 6.

Note that a method for acquiring and storing connection information such as the network identifier and security information of the simple AP function of the print apparatus 200 will be described later with reference to FIGS. 7A to 7D, 8A to 8F, and 9. A description will be given below assuming that information regarding the print apparatus 200 that includes connection information of the simple AP function of the print apparatus 200 is already stored in the nonvolatile memory 103 of the mobile phone 100. In addition, assume that, in a state of not being connected to the simple AP of the print apparatus 200, the connection unit 111 is connected to an external AP, or the mobile phone 100 can be connected to the Internet using the public network connection unit 113. Note that, in the present embodiment, a description will be given assuming that communication with a service server on the Internet is public wireless communication that is performed by the public network connection unit 113 via a public wireless network, but communication may be performed by connecting the connection unit 111 to an external AP that can communicate with the Internet.

FIG. 5 illustrates communication between the mobile phone 100, the print apparatus 200, and a service server, user's operations on the mobile phone 100 and the print apparatus 200, and operations of the mobile phone 100 and the print apparatus 200. FIG. 6 shows exemplary operations of the mobile phone 100 from when the user performs an operation on the mobile phone 100 to make an instruction to start printing. FIGS. 4A to 4G illustrate application screens that are displayed on the display unit 106 of the mobile phone 100, in the sequence in FIG. 5. Note that the processing in FIG. 6 is realized by the control unit 101 of the mobile phone 100 controlling the components of the mobile phone 100 according to operation input and a program.

Figure 4A:
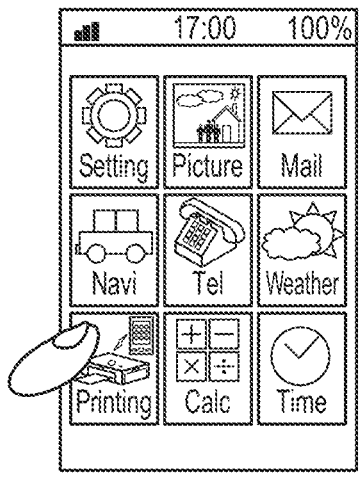
FIGS. 4A to 4G are diagrams illustrating User Interface screens of an application of the mobile phone according to the present embodiment.
Figure 4B:
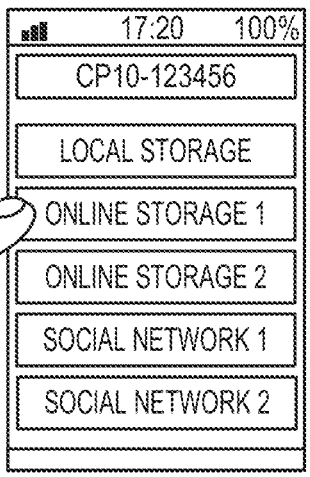

In FIG. 5, in step S501, the user of the mobile phone 100 gives an instruction to use a print application installed in the mobile phone 100, as shown in FIG. 4A. The control unit 101 of the mobile phone 100 reads a program of the print application from the nonvolatile memory 103, starts the program, and displays, on the display unit 106, a screen for prompting the user to select where images to be printed are saved as shown in FIG. 4B.

In step S502, once the user selects an online storage on the Internet, the procedure advances to step S503, and the control unit 101 of the mobile phone 100 controls the public network connection unit 113 so as to communicate with a service server on the Internet. When information for login is requested from the service server, the control unit 101 of the mobile phone 100 displays, on the display unit 106, a screen for inputting log-in information.

In step S504, when the user inputs log-in information, the procedure advances to step S505, and the control unit 101 of the mobile phone 100 controls the public network connection unit 113 so as to log in to the service server. When the mobile phone 100 logs in to the service server, images saved in the service server become available for download.

In step S506, the control unit 101 of the mobile phone 100 controls the public network connection unit 113 so as to download images from the service server, and saves the images in the work memory 104 or the recording medium 110. Note that an entire image file rather than an image may be acquired, a reduced-size image such as a thumbnail image may be acquired, or only image information such as a file name may be acquired. In addition, all of the images saved in the service server may be acquired, or some of the images may be acquired.

Figure 4C:
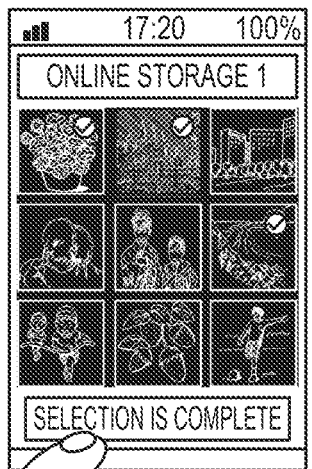

When images are downloaded from the service server, the control unit 101 of the mobile phone 100 displays an image list screen as shown in FIG. 4C, on the display unit 106.

In step S507, when the user selects images to be printed, the process advances to step S508, and the control unit 101 of the mobile phone 100 controls the public network connection unit 113 so as to download images of a size suitable for printing, from the service server. Note that, if downloading of the images of a size suitable for printing was completed in step S506, the process in step S508 may be omitted.

In step S509, the user performs an operation on the operation unit 205 of the print apparatus 200, and starts the print apparatus 200. When the print apparatus 200 is started, the control unit 201 of the print apparatus 200 controls the connection unit 209 so as to start a simple AP function. Accordingly, the mobile phone 100 is connected to the wireless LAN network of the simple AP of the print apparatus 200, thus enabling communication with the print apparatus 200. Note that, in the sequence in the present embodiment, the print apparatus 200 is started after images have been selected by the mobile phone 100, but the print apparatus 200 may be started before the operation of the mobile phone 100 in step S501.

Figure 4D:
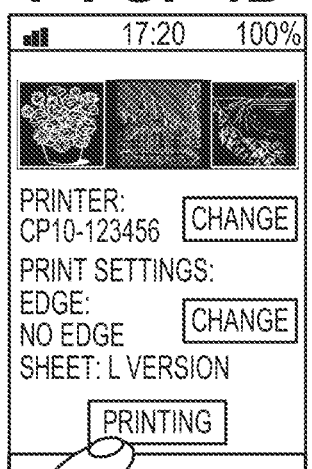

In step S511, a screen as shown in FIG. 4D for accepting an instruction to start printing from the user is displayed on the display unit 106, and the user performs an operation of starting printing via the display unit 106 of the mobile phone 100. Upon receiving the instruction to start printing from the user, the control unit 101 of the mobile phone 100 reads the connection information for connection to the simple AP of the print apparatus 200 from the nonvolatile memory 103 in step S601 in FIG. 6.

Figure 4E:
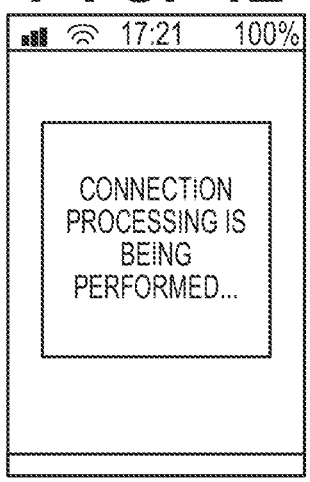

In step S512, the control unit 101 of the mobile phone 100 controls the connection unit 111 so as to perform processing for connecting the mobile phone 100 to the simple AP of the print apparatus 200. The operation in step S512 corresponds to the process in step S602 in FIG. 6. During the connection processing, as shown in FIG. 4E, a screen indicating that connection processing is being performed is displayed on the display unit 106. In this manner, the mobile phone 100 joins the wireless LAN network of the simple AP started by the print apparatus 200 in step S902. This prevents the control unit 101 of the mobile phone 100 from performing internet connection using the public network connection unit 113. Note that, a configuration may be adopted in which, if the print apparatus 200 cannot be discovered in step S512, an error is displayed on the display unit 106, and a screen for prompting the user to turn on the print apparatus 200 is displayed.

When wireless LAN connection with the simple AP of the print apparatus 200 is established by a connection unit 109, the control unit 101 of the mobile phone 100 controls the connection unit 109 so as to check that the print apparatus 200 can accept a print request as necessary.

In step S513, the control unit 101 of the mobile phone 100 controls the connection unit 109 so as to transmit a print request through wireless LAN communication, and transmit an image file in step S514. The operations in steps S513 and S514 correspond to the processes in steps S603 and S604 in FIG. 6.

Figure 4F:
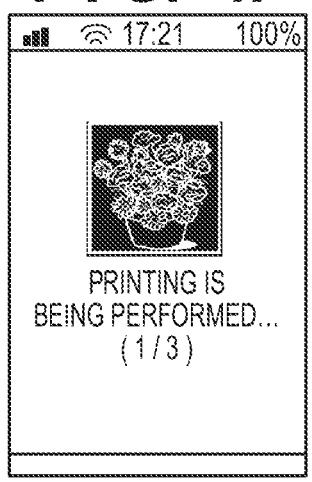

In step S515, the control unit 201 of the print apparatus 200 stores, in the work memory 203, image data received from the mobile phone 100, performs image processing, and then controls the sheet feeding unit 207 and the image printing unit 208 so as to perform printing on recording sheet. During printing, as shown in FIG. 4F, a screen indicating that printing is being performed is displayed on the display unit 106.

In step S516, the control unit 101 of the mobile phone 100 controls the connection unit 109 so as to periodically acquire the state of the print apparatus 200, and thereby monitors whether or not the print operation of the print apparatus 200 is complete. Note that a configuration may be adopted in which, once the print apparatus 200 completes printing, a print completion notification is transmitted to the mobile phone 100 via the connection unit 209, without the mobile phone 100 monitoring the state of the print apparatus 200. The operation in step S516 corresponds to the process in step S605 in FIG. 6.

Figure 4G:
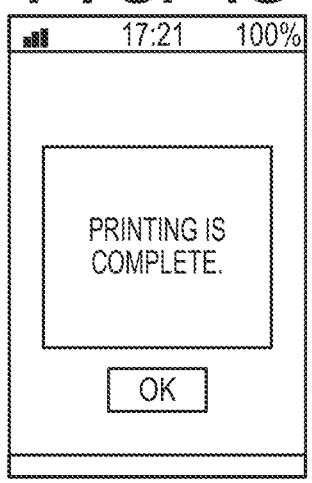

If it is confirmed that the print operation of the print apparatus 200 has ended, the control unit 101 of the mobile phone 100 determines in step S606 in FIG. 6 whether or not there is an image that has not been printed yet from among the images selected by the user. If it is determined in step S606 that there is still an image that has not been printed, the control unit 101 of the mobile phone 100 returns the process to step S603, and transmits a request to start printing to the print apparatus 200. In addition, if it is determined in step S606 that all of the images have been printed, the control unit 101 of the mobile phone 100 advances the process to step S607. When printing ends, a screen for performing notification that printing has ended is displayed on the display unit 106 as shown in FIG. 4G.

In step S517, the control unit 101 of the mobile phone 100 controls the connection unit 109 so as to disconnect connection to the simple AP of the print apparatus 200, and leave the wireless LAN network of the simple AP. The operation in step S517 corresponds to the process in step S617 in FIG. 6. Accordingly, the mobile phone 100 can perform internet connection via the public network connection unit 113 again.

Note that, in the present embodiment, transmission and printing are alternately performed one image at a time, but the print apparatus 200 may perform printing after all of the images selected by the user have been transmitted, or transmission of images and printing by the print apparatus 200 may be performed in parallel. In the former case, when transmission of all of the images selected by the user is complete, the mobile phone 100 may shut off the connection to the simple AP of the print apparatus 200 before printing of all of the images by the print apparatus 200 ends.

According to the present embodiment, the mobile phone 100 downloads images from the service server on the Internet via the public network connection unit 113, and transmits the images to the print apparatus 200 via the simple AP of the print apparatus 200, which performs printing, and then the mobile phone 100 can be connected to the Internet via the public network connection unit 113 again. If connection between the mobile phone 100 and the simple AP of the print apparatus 200 is restricted to only a period of transmission and printing of images in this manner, it is possible to minimize a period in which the mobile phone 100 is connected to the simple AP of the print apparatus 200.

Method in Which Mobile Phone 100 Acquires And Stores Simple AP Information of Print Apparatus 200

Next, a method in which the mobile phone 100 acquires and stores simple AP information of the print apparatus 200 according to the present embodiment will be described with reference to FIGS. 7A to 7D, FIGS. 8A to 8F, and FIG. 9.

FIG. 7A shows an example of setting information of the simple AP of the print apparatus 200. The ESSID, which is a network identifier, is a character string in which portions of the model name and the MAC address of the print apparatus 200 are used, and a different ESSID is set for each print apparatus, even for the same model. The security type is fixed for each model of the print apparatus 200, and, if the model can be determined, the security type can also be determined. In addition, the passphrase of an encryption key for connection to the simple AP of the print apparatus 200 is a character string that includes a random number. In the present embodiment, the passphrase includes a character string common with the ESSID in order to reduce the information amount.

FIGS. 7B and 7C illustrate a two-dimensional code 700 for notifying the mobile phone 100 of the setting information of the simple AP of the print apparatus 200 and character strings of the two-dimensional code information before being encoded. In the present embodiment, a QR code (registered trademark) is used as an example of the two-dimensional code, but a two-dimensional code other than a QR code (registered trademark) such as a bar code may also be used. The information character strings of the two-dimensional code include information that enables the simple AP setting information of the print apparatus 200 to be specified. The mobile phone 100 can recognize the setting information of the simple AP of the print apparatus 200 by reading the two-dimensional code 700 of the print apparatus 200 as shown in FIG. 7D.

FIG. 9 illustrates operations of the mobile phone 100 and the print apparatus 200 and operations performed on the mobile phone 100 and the print apparatus 200 by the user, from when the mobile phone 100 acquires the simple AP setting information of the print apparatus 200 until when the mobile phone 100 stores the information. FIGS. 8A to 8F illustrate application screens that are displayed on the display unit 106 of the mobile phone 100, in the procedure in FIG. 9.

In step S901, the user performs an operation on the operation unit 205 of the print apparatus 200 so as to start the print apparatus 200.

In step S902, the control unit 201 of the print apparatus 200 controls the connection unit 209 so as to start the simple AP function. Accordingly, the mobile phone 100 is connected to the simple AP of the print apparatus 200 via a wireless LAN, and can communicate with the print apparatus 200.

In step S903, a screen for (prompting) the user to select an application installed on the mobile phone 100 is displayed on the display unit 106 as shown in FIG. 8A, and the user performs an operation of starting a print application, via the display unit 106 of the mobile phone 100. In response to this, the control unit 101 of the mobile phone 100 reads a program of the print application from the nonvolatile memory 103, starts the program, and displays, on the display unit 106, a screen for prompting the user to newly register a print apparatus as shown in FIG. 8B.

In step S904, when the user performs a new registration operation via the display unit 106 of the mobile phone 100, the process advances to step S905.

In step S905, the control unit 101 of the mobile phone 100 starts the image capturing unit 102, and displays, on the display unit 106, a screen for reading a two-dimensional code of a print apparatus as shown in FIG. 8C.

In step S906, the user points the image capturing unit 102 of the mobile phone 100 at the two-dimensional code 700 in which character strings that include information for connection to the simple AP of the print apparatus 200 as shown in FIG. 7D are encoded.

In step S907, the control unit 101 of the mobile phone 100 controls the image capturing unit 102 so as to read the two-dimensional code, and, in step S908, decodes the two-dimensional code and analyzes the information.

When the connection information of the simple AP of the print apparatus 200 is acquired through the analysis in step S908, the control unit 101 of the mobile phone 100 displays, on the display unit 106, a screen for accepting an instruction to start connection from the user as shown in FIG. 8D, and the user performs an operation of starting connection via the display unit 106 of the mobile phone 100.

In step S909, the control unit 101 of the mobile phone 100 controls the connection unit 111 so as to perform processing for connecting the mobile phone 100 to the simple AP of the print apparatus 200. During the connection processing, a screen indicating that connection processing is underway is displayed on the display unit 106 as shown in FIG. 8E. In this manner, the mobile phone 100 joins the wireless LAN network of the simple AP started by the print apparatus 200 in step S902. Note that a configuration may also be adopted in which, if the print apparatus 200 cannot be discovered in step S909, an error is displayed on the display unit 106, and a screen for prompting the user to turn on the print apparatus 200 is displayed.

In step S910, when connection to the simple AP of the print apparatus 200 is complete, the control unit 101 of the mobile phone 100 controls the connection unit 111 so as to perform information acquisition processing for acquiring other information from the print apparatus 200. In the information acquisition processing, the control unit 101 of the mobile phone 100 acquires, from the print apparatus 200, information such as an individual name, a model name, and a MAC address of the print apparatus.

After the information acquisition processing is complete, in step S911, the control unit 101 of the mobile phone 100 controls the connection unit 111 so as to disconnect the connection to the simple AP of the print apparatus 200, and leave the wireless LAN network of the simple AP.

In step S912, the control unit 101 of the mobile phone 100 stores, in the nonvolatile memory 103, the connection information acquired by analyzing the two-dimensional code in step S908 and the other information of the print apparatus 200 acquired in step S910, and displays, on the display unit 106, a screen for performing notification that registration is complete as shown in FIG. 8F.

Note that, in the present embodiment, only the minimum connection information for connection to the simple AP of the print apparatus 200 is written in the two-dimensional code, and other information is acquired via the wireless LAN network formed by the simple AP function of the print apparatus 200. Alternatively, a configuration may also be adopted in which all of the information required for registration is converted into a two-dimensional code, and wireless LAN connection is not performed at the time of registration.

Moreover, in the present embodiment, a method for registering information using a two-dimensional code is described as an example of a registration method, but the registration method is not limited thereto, and the following methods may also be used, for example.

A method in which the mobile phone 100 reads encoded information other than a two-dimensional code A method in which the user performs an operation on the display unit 106 of the mobile phone 100, and performs manual registration A method for connecting the mobile phone 100 and the print apparatus 200 through non-contact near-field wireless communication such as NFC (Near Field Communication) or a wired cable such as a USB (Universal Serial Bus), and acquiring and registering information According to the present embodiment, the mobile phone 100 is connected to the print apparatus 200 through the procedure shown in FIG. 9, but the connection to the print apparatus 200 is disconnected temporarily. Accordingly, for example, after connection to the print apparatus 200 is shut off, the user can connect to the Internet using the mobile phone 100, and use various online services.

In addition, in the present embodiment, it is envisioned that the user stores, in the mobile phone 100, information for connection to the print apparatus 200 in advance through the procedure shown in FIG. 9, and then starts connection and printing through the procedure shown in FIG. 5. In this case, the print application may display a screen for prompting the user to start the procedure shown in FIG. 5 after connection to the print apparatus 200 is disconnected in the procedure shown in FIG. 9. Accordingly, as a result of screen display being performed so as to automatically guide the user from step S912 in FIG. 9 to step S501 in the procedure in FIG. 5, the user can execute connection and printing without being lost for operations. In this case, for example, after the screen in FIG. 8F, the screen transitions to the screen in FIG. 4A so as to prompt the user to select images to be transmitted.

In addition, even when continuously executing processes from registration in FIG. 9 to image acquisition in FIG. 5, connection to the simple AP of the print apparatus 200 is disconnected in step S911 in FIG. 9, and the operation in FIG. 5 is then executed (while the mobile phone 100 is connected to the Internet, connection to the simple AP of the print apparatus 200 is disconnected). Accordingly, it is possible to minimize the state where the mobile phone 100 cannot be connected to the Internet due to being connected to the print apparatus 200.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-101487, filed May 30, 2019 which is hereby incorporated by reference herein in its entirety.

What is claimed is:

1. An image capture apparatus comprising:
a communication interface configured to join a wireless network generated by a print apparatus; and
a memory and at least one processor and/or at least one circuit which function as:
an instruction unit configured to instruct the print apparatus to print an image;
a recognition unit configured to recognize information for joining the wireless network, from an image captured by an image capturing unit; and
a control unit configured to perform control so as to execute information acquisition processing in response to the recognition unit having recognized the information for joining the wireless network,
wherein, in the information acquisition processing, the control unit performs control so as to join the wireless network generated by the print apparatus, via the communication interface based on information read by the image capturing unit, acquire information regarding the print apparatus via the communication interface, and leave the wireless network generated by the print apparatus, and
when an instruction to print an image is accepted from a user in a state where the information regarding the print apparatus has been acquired, the image capture apparatus joins the wireless network generated by the print apparatus via the communication interface, and the instruction unit instructs the print apparatus to print an image, via the wireless network,
wherein the image capture apparatus leaves the wireless network in response to completion of printing of the image for which a print instruction was given.

2. The apparatus according to claim 1, further comprising a public wireless communication interface,
wherein, in a state where the image capture apparatus has joined the wireless network generated by the print apparatus using the communication interface, connection to a public wireless network via the public wireless communication interface is restricted.

3. The apparatus according to claim 2, wherein
connection to a server that manages images can be made via the public wireless communication interface,
an image for which an instruction made by the user to perform printing is accepted includes an image managed by the server connected to the image capture apparatus via the public wireless communication interface, and
the public wireless communication interface downloads, from the server, the image for which an instruction made by the user to perform printing has been accepted.

4. The apparatus according to claim 1, wherein
the image for which an instruction made by the user to perform printing is accepted includes an image generated by the image capturing unit.

5. The apparatus according to claim 1, wherein
the instruction to print the image is accepted in a state where the communication interface has not joined the wireless network generated by the print apparatus.

6. The apparatus according to claim 1, wherein
the recognition unit has a function of recognizing a two-dimensional code, and
the recognition unit recognizes the information for joining the wireless network by recognizing a two-dimensional code in which the information for joining the wireless network is encoded.

7. The apparatus according to claim 6, wherein
the two-dimensional code includes a QR code.

8. A method of controlling an image capture apparatus that has a communication interface configured to join a wireless network generated by a print apparatus, the method comprising:
recognizing information for joining the wireless network, from an image captured by an image capturing unit; and
performing control so as to execute information acquisition processing in response to information for joining the wireless network having been recognized,
wherein, in the information acquisition processing, control is performed so as to join the wireless network generated by the print apparatus, via the communication interface based on information read by the image capturing unit, acquire information regarding the print apparatus via the communication interface, and leave the wireless network generated by the print apparatus, and
when an instruction to print an image is accepted from a user in a state where the information regarding the print apparatus has been acquired, the image capture apparatus joins the wireless network generated by the print apparatus via the communication interface, and an instruction to print an image is given to the print apparatus via the wireless network,
wherein the image capture apparatus leaves the wireless network in response to completion of printing of the image for which a print instruction was given.

9. A non-transitory computer-readable storage medium storing a program for causing a computer to execute a method of controlling an image capture apparatus that has a communication interface configured to join a wireless network generated by a print apparatus, the method comprising:
recognizing information for joining the wireless network, from an image captured by an image capturing unit; and
performing control so as to execute information acquisition processing in response to information for joining the wireless network having been recognized,
wherein, in the information acquisition processing, control is performed so as to join the wireless network generated by the print apparatus, via the communication interface based on information read by the image capturing unit, acquire information regarding the print apparatus via the communication interface, and leave the wireless network generated by the print apparatus, and
when an instruction to print an image is accepted from a user in a state where the information regarding the print apparatus has been acquired, the image capture apparatus joins the wireless network generated by the print apparatus via the communication interface, and an instruction to print an image is given to the print apparatus via the wireless network,
wherein the image capture apparatus leaves the wireless network in response to completion of printing of the image for which a print instruction was given.

10. The non-transitory computer-readable storage medium according to claim 9,
wherein the image capture apparatus further comprises a public wireless communication interface,
wherein, in a state where the image capture apparatus has joined the wireless network generated by the print apparatus using the communication interface, connection to a public wireless network via the public wireless communication interface is restricted.

11. The non-transitory computer-readable storage medium according to claim 10, wherein
connection to a server that manages images can be made via the public wireless communication interface,
an image for which an instruction made by the user to perform printing is accepted includes an image managed by the server connected to the image capture apparatus via the public wireless communication interface, and
the public wireless communication interface downloads, from the server, the image for which an instruction made by the user to perform printing has been accepted.

12. The non-transitory computer-readable storage medium according to claim 9, wherein
the image for which an instruction made by the user to perform printing is accepted includes an image generated by the image capturing unit.

13. The non-transitory computer-readable storage medium according to claim 9, wherein
the instruction to print the image is accepted in a state where the communication interface has not joined the wireless network generated by the print apparatus.

14. The non-transitory computer-readable storage medium according to claim 9, wherein
in the recognizing, the information for joining the wireless network is recognized by recognizing a two-dimensional code in which the information for joining the wireless network is encoded.

15. The non-transitory computer-readable storage medium according to claim 14, wherein
the two-dimensional code includes a QR code.

* * * * *